(12) United States Patent
Jang et al.

(10) Patent No.: US 7,778,479 B2
(45) Date of Patent: Aug. 17, 2010

(54) MODIFIED GABOR FILTER FOR IMAGE PROCESSING

(75) Inventors: Won-Churl Jang, Seoul (KR); Dong-Jae Lee, Seoul (KR); Deok-Soo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1130 days.

(21) Appl. No.: 11/433,878

(22) Filed: May 12, 2006

(65) Prior Publication Data

US 2006/0269160 A1    Nov. 30, 2006

(30) Foreign Application Priority Data

May 25, 2005    (KR)    ............... 10-2005-0044174

(51) Int. Cl.
G06K 9/40    (2006.01)
(52) U.S. Cl. ..................................... 382/260
(58) Field of Classification Search .............. 382/260
See application file for complete search history.

(56) References Cited

U.S. PATENT DOCUMENTS

| | | | | |
|---|---|---|---|---|
| 5,537,344 | A | 7/1996 | Isshiki et al. ............ | 364/725 |
| 6,493,031 | B1 | 12/2002 | Washizawa ............ | 348/335 |
| 6,546,155 | B1 | 4/2003 | Krishnamachari ....... | 382/296 |
| 6,577,764 | B2 | 6/2003 | Myler et al. ............ | 382/228 |
| 2001/0031103 | A1 | 10/2001 | Kim et al. | |
| 2003/0169910 | A1* | 9/2003 | Reisman et al. ......... | 382/124 |
| 2005/0076321 | A1* | 4/2005 | Smith ..................... | 716/19 |

OTHER PUBLICATIONS

Yang, J.W.[Jian-Wei], Liu, L.F.[Li-Feng], Jiang, T.Z.[Tian-Zi], Fan, Y.[Yong], "A modified Gabor filter design method for fingerprint image enhancement," PRL(24), No. 12, Aug. 2003, pp. 1805-1817.*
Loy, G., "Fast Computation of the Gabor Wavelet Transform," Proc. of Digital Image Computing—Techniques and Applications (DICTA2002), Melbourne, Jan. 2002.*
WIPO Patent Publication No. WO 2004/053790 to Scholze et al. entitled "Method for the Gabor Filtration of Image Signals".
Jianwei Yang et al., "A Modified Gabor Filter Design Method for Fingerprint Image Enhancement", Pattern Recognition Letters 24 (2003), pp. 1805-1817.
Vincent Levesque, "Texture Segmentation using Gabor Filters", Center for Intelligent Machines, McGill University, Dec. 6, 2000.
Korean Patent Application No. 1020000062260 to Bi et al., having Publication date of Aug. 21, 2001 (w/ English Abstract page).
Japanese Patent Application No. 04-195922 to Nobuyuki et al., having Publication date of Jan. 28, 1994 (w/ English Abstract page).
Japanese Patent Application No. 2003-094581 to Kunihiko, having Publication date of Oct. 28, 2004 (w/ English Abstract page).

* cited by examiner

Primary Examiner—Charles Kim
Assistant Examiner—Nirav G Patel
(74) Attorney, Agent, or Firm—Monica H. Choi

(57) ABSTRACT

In a Gabor filter, a modified Gabor mask function is generated from an original Gabor mask function. A convolution of an image is performed with the modified Gabor mask function to generate a filtered image. The modification of the original Gabor mask function to the modified Gabor mask function reduces a number of calculations during such a convolution.

6 Claims, 22 Drawing Sheets

Fig. 2

| 0 | 0 | -2 | -5 | -5 | -2 | 3 | 10 | 13 | 10 | 3 | -2 | -5 | -5 | -2 | 0 | 0 |
|---|---|---|---|---|---|---|---|---|---|---|---|---|---|---|---|---|
| 0 | 0 | -4 | -9 | -10 | -4 | 5 | 16 | 21 | 16 | 5 | -4 | -10 | -9 | -4 | 0 | 0 |
| 1 | -1 | -8 | -14 | -15 | -7 | 8 | 25 | 32 | 25 | 8 | -7 | -15 | -14 | -8 | -1 | 1 |
| 1 | -2 | -12 | -21 | -23 | -10 | 12 | 35 | 45 | 35 | 12 | -10 | -23 | -21 | -12 | -2 | 1 |
| 2 | -3 | -15 | -28 | -30 | -14 | 16 | 47 | 60 | 47 | 16 | -14 | -30 | -28 | -15 | -3 | 2 |
| 3 | -4 | -20 | -36 | -39 | -17 | 20 | 59 | 75 | 59 | 20 | -17 | -39 | -36 | -20 | -4 | 3 |
| 3 | -4 | -24 | -42 | -45 | -21 | 24 | 69 | 88 | 69 | 24 | -21 | -45 | -42 | -24 | -4 | 3 |
| 4 | -5 | -26 | -47 | -50 | -23 | 26 | 76 | 96 | 76 | 26 | -23 | -50 | -47 | -26 | -5 | 4 |
| 4 | -5 | -27 | -48 | -52 | -24 | 27 | 78 | 100 | 78 | 27 | -24 | -52 | -48 | -27 | -5 | 4 |
| 4 | -5 | -26 | -47 | -50 | -23 | 26 | 76 | 96 | 76 | 26 | -23 | -50 | -47 | -26 | -5 | 4 |
| 3 | -4 | -24 | -42 | -45 | -21 | 24 | 69 | 88 | 69 | 24 | -21 | -45 | -42 | -24 | -4 | 3 |
| 3 | -4 | -20 | -36 | -39 | -17 | 20 | 59 | 75 | 59 | 20 | -17 | -39 | -36 | -20 | -4 | 3 |
| 2 | -3 | -15 | -28 | -30 | -14 | 16 | 47 | 60 | 47 | 16 | -14 | -30 | -28 | -15 | -3 | 2 |
| 1 | -2 | -12 | -21 | -23 | -10 | 12 | 35 | 45 | 35 | 12 | -10 | -23 | -21 | -12 | -2 | 1 |
| 1 | -1 | -8 | -14 | -15 | -7 | 8 | 25 | 32 | 25 | 8 | -7 | -15 | -14 | -8 | -1 | 1 |
| 0 | 0 | -4 | -9 | -10 | -4 | 5 | 16 | 21 | 16 | 5 | -4 | -10 | -9 | -4 | 0 | 0 |
| 0 | 0 | -2 | -5 | -5 | -2 | 3 | 10 | 13 | 10 | 3 | -2 | -5 | -5 | -2 | 0 | 0 |

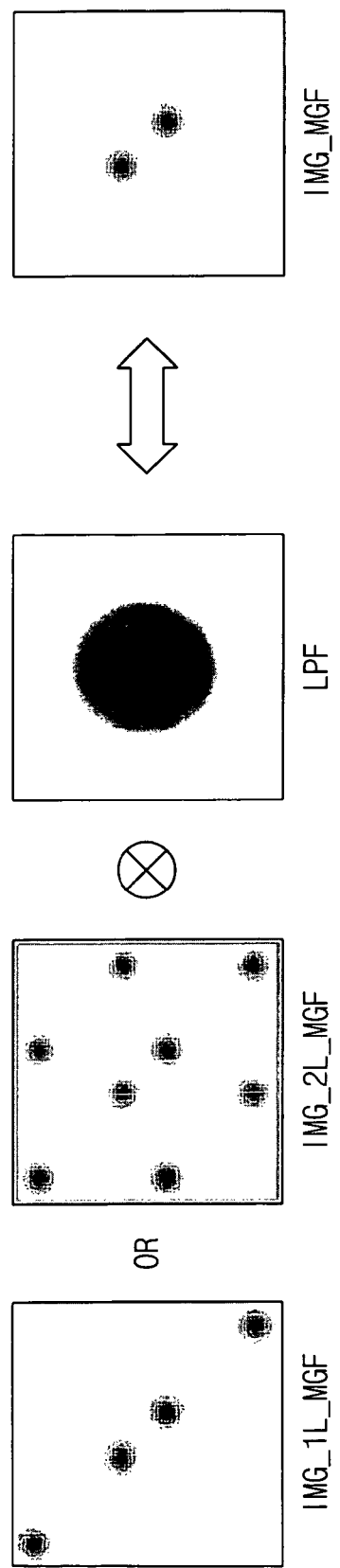

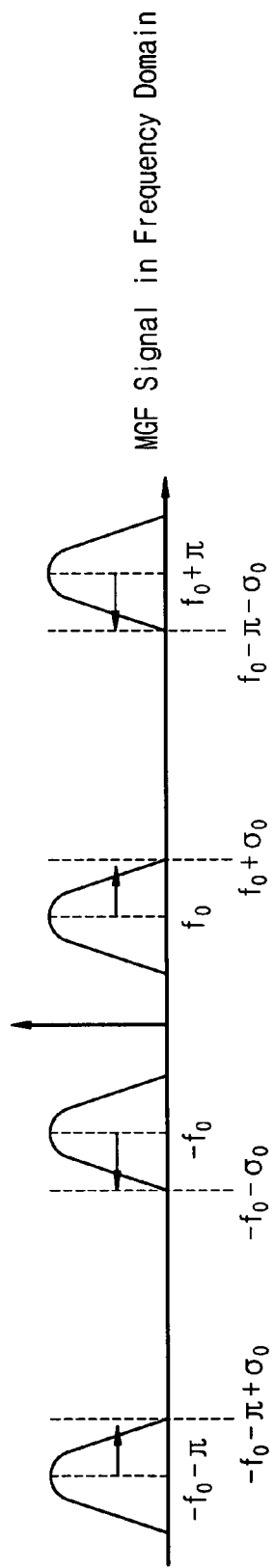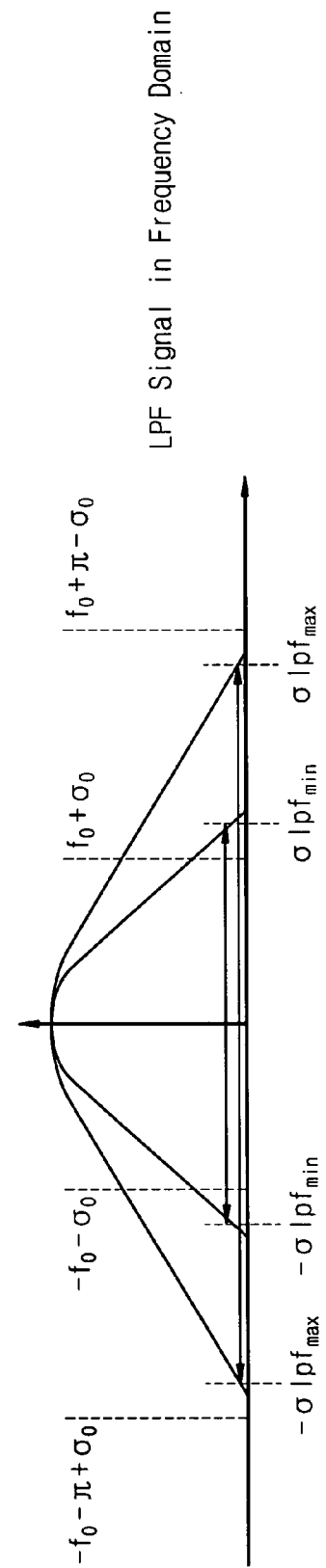
Fig. 11A
Fig. 11B

Fig. 18A   Fig. 18B   Fig. 18C
 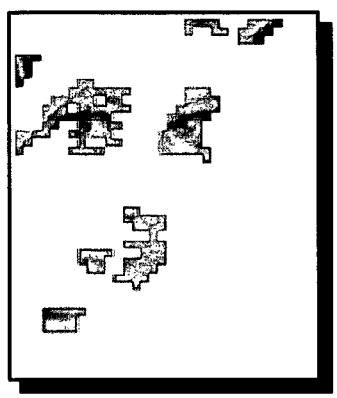 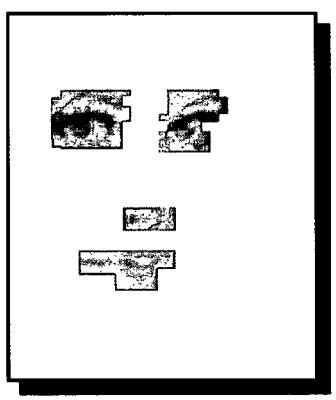
Fig. 18D   Fig. 18E   Fig. 18F
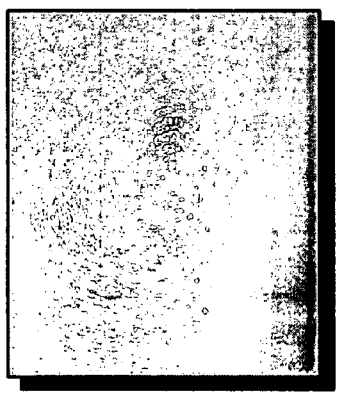 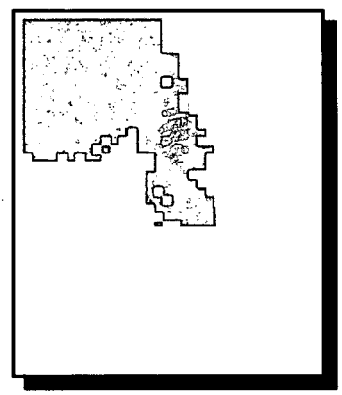 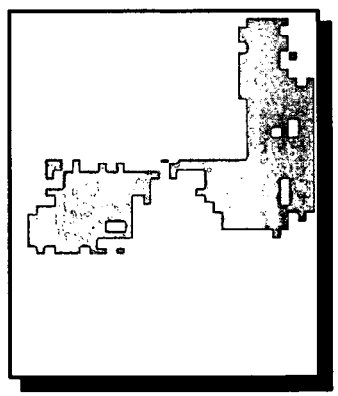

MODIFIED GABOR FILTER FOR IMAGE PROCESSING

CROSS-REFERENCE TO RELATED APPLICATIONS

This patent application claims priority under 35 U.S.C. §119 to Korean Patent Application No. 2005-44174 filed on May 25, 2005, the entire contents of which are incorporated herein by reference.

TECHNICAL FIELD

The present invention relates generally to image processing, and more particularly, to modification of Gabor filtering for reducing the amount of calculations.

BACKGROUND

A two-dimensional Gabor filter passes specific orientations, frequencies, or components of an input signal. Such a Gabor filter is applied for image processing in the spatial domain for image enhancement, image restoration, texture analysis of an image, or image segmentation.

For example, U.S. Pat. No. 6,577,764 to Myler et al. is entitled "METHOD FOR MEASURING AND ANALYZING DIGITAL VIDEO QUALITY" and discloses measuring and analyzing the quality of video images by Gabor-filtering. U.S. Pat. No. 6,493,031 to Washizawa is entitled "VISUAL INFORMATION PROCESSING METHOD AND APPARATUS FOR EXTRACTING FEATURE QUANTITIES FROM A TWO-DIMENSIONAL IMAGE SIGNAL" and discloses characterizing 2-dimensional images by Gabor-filtering. Further, U.S. Pat. No. 6,546,155 to Krishnamachari is entitled "SYSTEM AND METHOD FOR ROTATION INVARIANT REPRESENTATION OF TEXTURE IN IMAGES" and discloses representing texture parameters that vary with rotation by Gabor-filtering.

Generally, a Gabor filter performs a convolution of an image with a Gabor mask function. Numerous calculations are performed for such a convolution, especially since the image is two-dimensional, and since the Gabor mask function has numerous parameters. Furthermore, the image may be organized into multiple regions, and a respective convolution is repeated for each of the multiple regions. Numerous calculations are performed for such repetition of convolutions.

However, a Gabor filter for performing numerous calculations is difficult to implement especially within an embedded system formed on a single silicon die.

SUMMARY OF THE INVENTION

Accordingly, in an aspect of the present invention, a Gabor mask function is modified for reducing the number of calculations in Gabor filtering.

In a Gabor filter according to an aspect of the present invention, a modified Gabor mask function is generated from an original Gabor mask function. A convolution of an image is performed with the modified Gabor mask function to generate a first filtered image. The modification of the original Gabor mask function to the modified Gabor mask function reduces a number of calculations during such a convolution.

In one embodiment of the present invention, the original Gabor mask function is a modulated Gaussian function.

In an example embodiment of the present invention, the modified Gabor mask function has a zero-value for substantially half of coordinate points, and a calculation is not performed for the zero-values of the modified Gabor mask function during the convolution. For example, the modified Gabor mask function is expressed as:

$$g_{1L}(x, y, \theta_i, f_j) = \frac{1}{2}\{h(x, y, \theta_i, f_j) + (e^{j\pi})^{x+y} h(x, y, \theta_i, f_j)\}$$

with $h(x, y, \theta_i, f_j)$ being the original Gabor mask function that is expressed as:

$$\exp\left\{-\frac{1}{2}\left[\frac{(x\cos\theta_i)^2}{\delta_x^2} + \frac{(y\sin\theta_i)^2}{\delta_y^2}\right]\right\}\cos\{2\pi f_j(x\sin\theta_i + y\cos\theta_i)\};$$

with x and y respectively denoting X and Y coordinates; $\theta_i$ and $f_j$ respectively denoting an orientation and a frequency; and $\delta_x$ and $\delta_y$ respectively denoting Gaussian standard deviations along the X and Y coordinates.

In another example embodiment of the present invention, the modified Gabor filter has a zero-value at substantially three-fourths of coordinate points, and a calculation is not performed during the convolution for the zero-values of the modified Gabor mask function. For example, the modified Gabor mask function is expressed as:

$$g_{2L}(x, y, \theta_i, f_j) = \frac{1}{4}\{(e^{j\pi})^x h(x, y, \theta_i, f_j) +$$
$$(e^{j\pi})^y h(x, y, \theta_i, f_j) + 2g_{1L}(x, y, \theta_i, f_j)\}$$
$$= \frac{1}{4}\{(-1)^x h(x, y, \theta_i, f_j) + (-1)^y h(x, y, \theta_i, f_j) +$$
$$h(x, y, \theta_i, f_j) + (-1)^{x+y} h(x, y, \theta_i, f_j)\}$$

with $h(x,y,\theta_i,f_j)$ being the original Gabor mask function that is expressed as:

$$\exp\left\{-\frac{1}{2}\left[\frac{(x\cos\theta_i)^2}{\delta_x^2} + \frac{(y\sin\theta_i)^2}{\delta_y^2}\right]\right\}\cos\{2\pi f_j(x\sin\theta_i + y\cos\theta_i)\};$$

with x and y respectively denoting X and Y coordinates; with $\theta_i$ and $f_j$ respectively denoting an orientation and a frequency; and with $\delta_x$ and $\delta_y$ respectively denoting Gaussian standard deviations along the X and Y coordinates.

In another embodiment of the present invention, a LPF (low pass filter) mask function is generated. A convolution of the first filtered image is performed with the LPF mask function to generate a second filtered image comprised of low-frequency components of the first filtered image.

Such a Gabor filter may be applied to particular advantage for image enhancement, image segmentation, or for generating feature codes of the image. However, the Gabor filter of the present invention may also be applied to other applications for image processing.

These and other features and advantages of the present invention will be better understood by considering the fol-

BRIEF DESCRIPTION OF THE FIGURES

FIGS. 2 and 3 illustrate two-dimensional and three-dimensional representations of an example original Gabor mask function;

FIG. 10 shows two-dimensional power spectrum representations for illustrating low pass filtering in the system of FIG. 1, according to an embodiment of the present invention;

FIGS. 11A, 11B, and 11C show frequency characteristics along a one-dimensional projection from FIG. 10 illustrating design of a low pass filter in the system of FIG. 1, according to an embodiment of the present invention;

FIGS. 18A, 18B, 18C, 18D, 18E, and 18F show example images resulting when the image processing system of FIG. 1 performs image segmentation, according to an embodiment of the present invention;

The figures referred to herein are drawn for clarity of illustration and are not necessarily drawn to scale. Elements having the same reference number in FIGS. 1, 2, 3, 4, 5, 6, 7, 8, 9, 10, 11, 12, 13, 14, 15, 16, 17, 18, 19, 20, 21, and 22 refer to elements having similar structure and/or function.

DETAILED DESCRIPTION OF PREFERRED EMBODIMENTS

Figure 1:
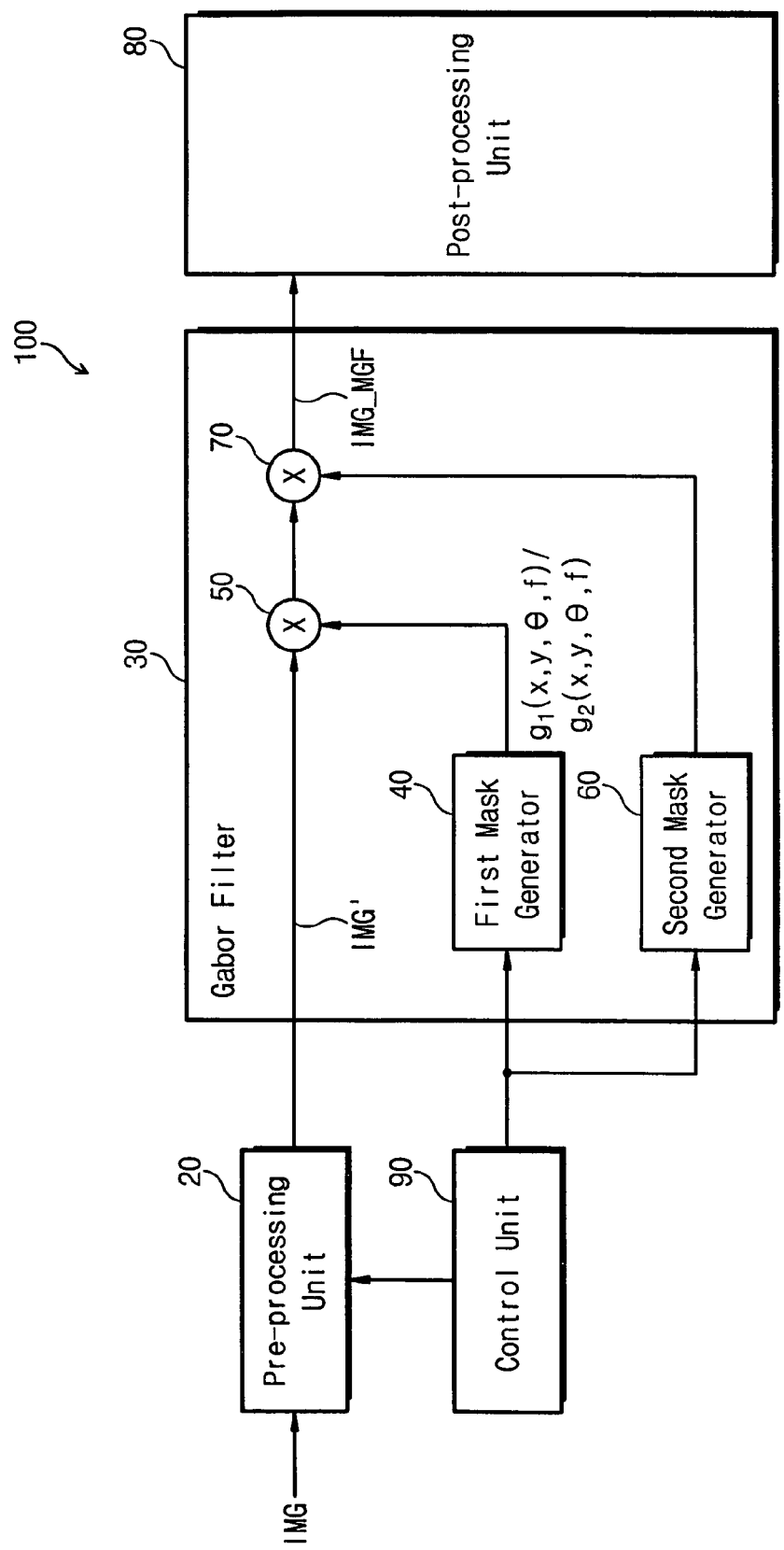
FIG. 1 is a block diagram of an image processing system having a Gabor filter, according to an embodiment of the present invention.

FIG. 1 is a block diagram of an image processing system 100 having a Gabor filter 30, according to an embodiment of the present invention. Referring to FIG. 1, the image processing system 100 includes a pre-processing unit 20, the Gabor filter 30, a post-processing unit 80, and a control unit 90.

The Gabor filter 30 passes specific orientations, frequencies, or components of an image IMG'. The Gabor filter 30 is enhanced according to the present invention such that the image processing system 100 performs image enhancement, image segmentation, and/or feature code generation of an image with minimized number of calculations. Thus, the image processing system 100 may advantageously be implemented within an embedded system.

The pre-processing unit 20 enhances the quality of an initial image IMG, such as for contrast enhancement, normalization, and/or noise cancellation, to generate a pre-processed image IMG'. The pre-processing unit 20 may also adjust the size and format of the initial image IMG into dimensions proper for the Gabor filter 30 such as by dividing the initial image IMG into a plurality of regions.

The post-processing unit 80 further processes a filtered image IMG_MFG from the Gabor filter 30 for image enhancement, image segmentation, and/or feature code generation. The control unit 90 controls the components 20, 40, and 60 of the image processing system 100 such as for timing control for example.

Further referring to FIG. 1, the Gabor filter 30 includes a first mask generator 40, a first filter 50, a second mask generator 60, and a second filter 70. The first mask generator 40 generates a modified mask function $g_1(x, y, \theta, f)$ or $g_2(x, y, \theta, f)$ from an original mask function $h(x, y, \theta, f)$. The first filter 50 performs a convolution of the image IMG' with such a modified mask function $g_1(x, y, \theta, f)$ or $g_2(x, y, \theta, f)$ from the first mask generator 40 to generate a first filtered image.

The second mask generator 60 generates a LPF (low pass filter) mask function for the second filter 70. The second filter 70 performs a convolution of the first filtered image from the first filter 50 with such a LPF mask function to generate a second filtered image IMG_MGF.

The present invention may also be practiced with or without the second mask generator 60 and the second filter 70. For example, when the image processing system 100 extracts features of the image IMG or is applied for segmentation of the image IMG, the Gabor filter 30 may include just the first mask generator 40 and the first filter 50, for further reducing the number of calculations in the Gabor filter 30. On the other hand, when the image processing system 100 is applied for image enhancement that is sensitive to high-frequency components, the Gabor filter also includes the second mask generator 60 and the second filter 70.

Figure 21:
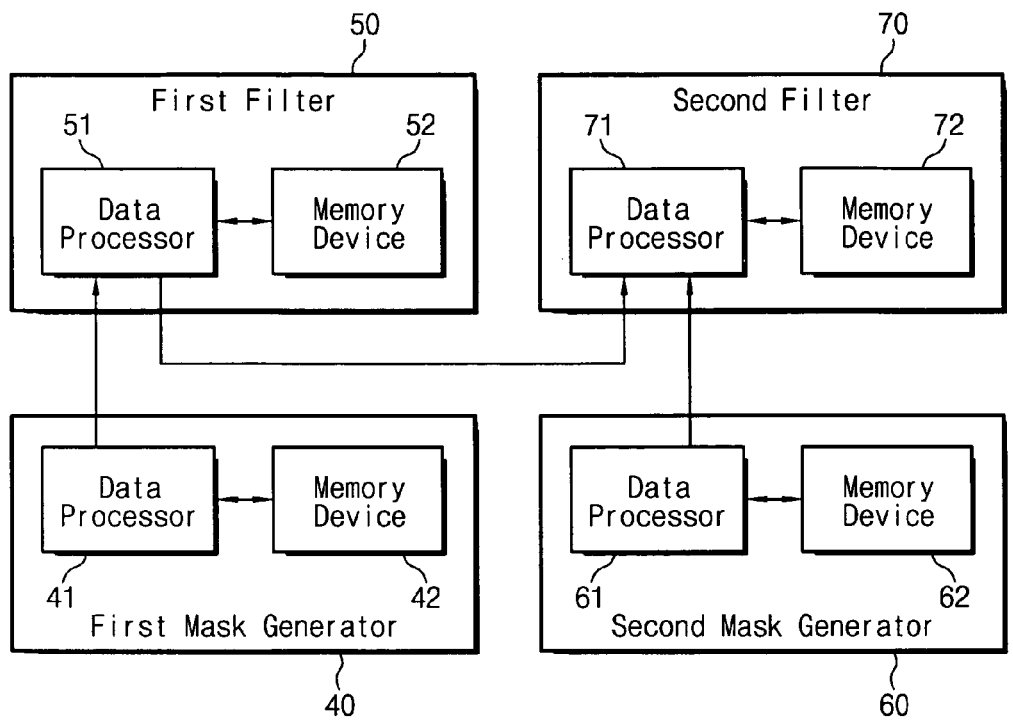
FIGS. 21 and 22 shows example implementations for the components of the image processing system of FIG. 1, according to an embodiment of the present invention.

Referring to FIG. 21, the first mask generator 40 is implemented with a data processor 41 and a memory device 42 having sequences of instructions (i.e., software) stored thereon, in one example embodiment of the present invention. Execution of such sequences of instructions by the data processor 41 causes the data processor 41 to perform any operational steps of the first mask generator 40 as described herein.

Similarly, the first filter 50 is implemented with a data processor 51 and a memory device 52 having sequences of instructions (i.e., software) stored thereon, in one example embodiment of the present invention. Execution of such sequences of instructions by the data processor 51 causes the data processor 51 to perform any operational steps of the first filter 50 as described herein.

Further, the second mask generator 60 is implemented with a data processor 61 and a memory device 62 having sequences of instructions (i.e., software) stored thereon, in one example embodiment of the present invention. Execution of such sequences of instructions by the data processor 61 causes the data processor 61 to perform any operational steps of the second mask generator 60 as described herein.

Also, the second filter 70 is implemented with a data processor 71 and a memory device 72 having sequences of instructions (i.e., software) stored thereon, in one example embodiment of the present invention. Execution of such sequences of instructions by the data processor 71 causes the data processor 71 to perform any operational steps of the second filter 70 as described herein.

Figure 22:
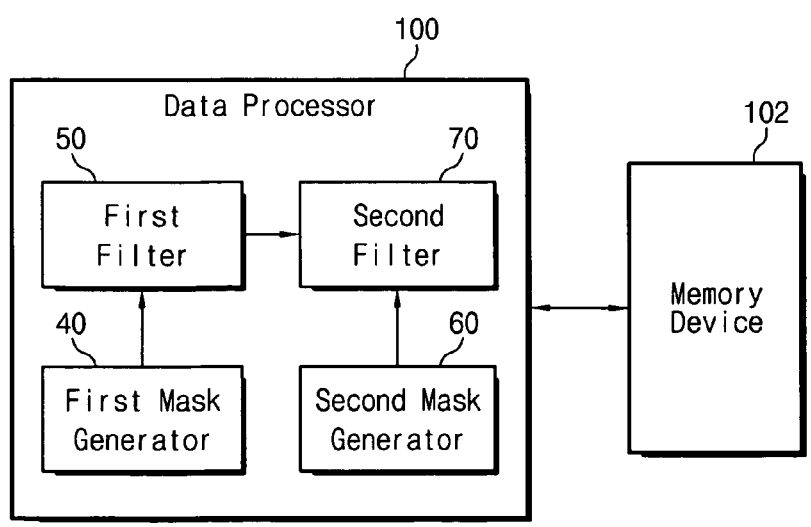

FIG. 22 shows an alternative embodiment of the present invention with components 40, 50, 60, and 70 of the Gabor filter 30 being implemented within one data processor 100 being coupled to a memory device 102 having sequences of instructions (i.e., software) stored thereon. Execution of such sequences of instructions by the data processor 100 causes the data processor 100 to perform any operational steps of the first mask generator 40, the first filter 50, the second mask generator 60, and the second filter 70 as described herein.

Figure 12:
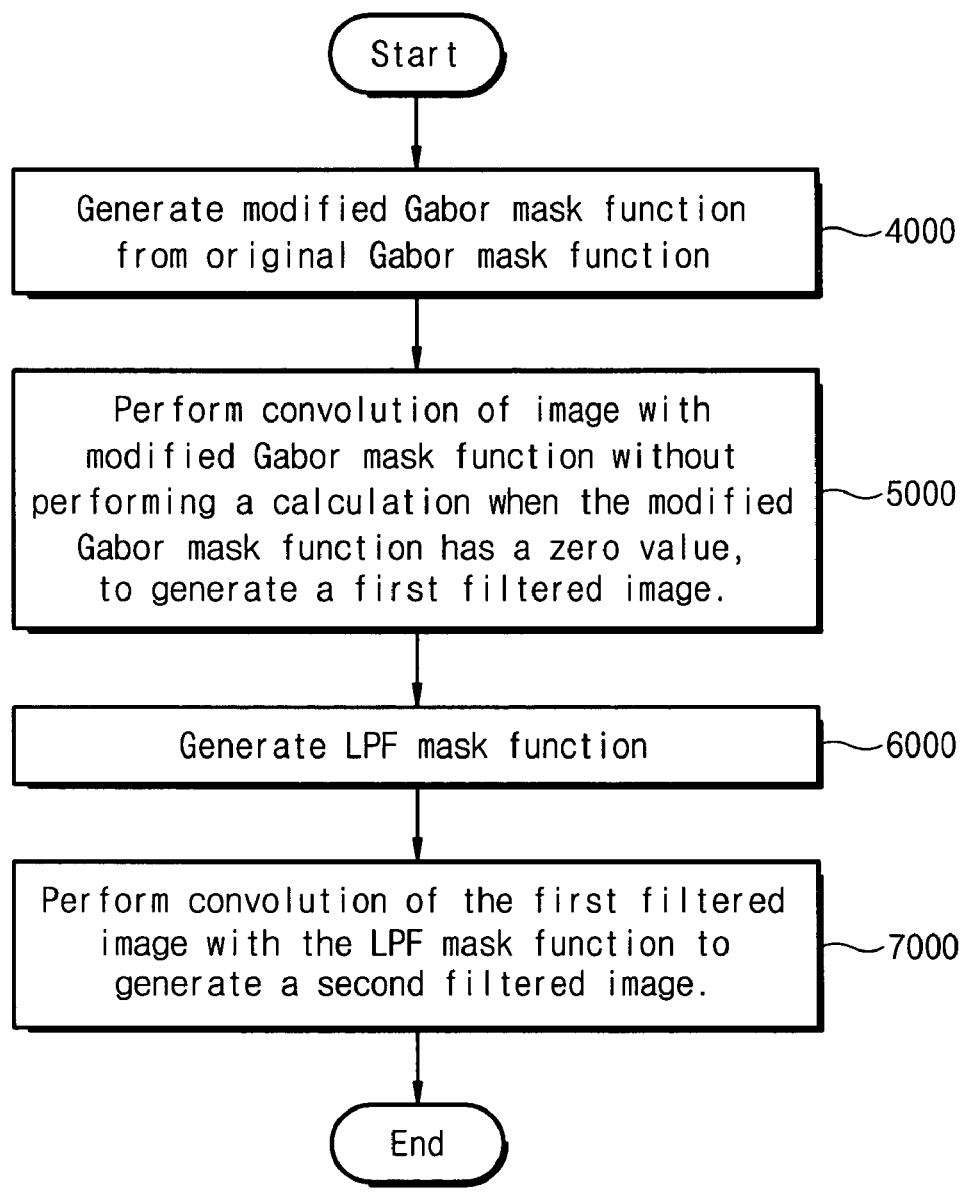
FIG. 12 is a flow chart of steps during operation of the Gabor filter in FIG. 1, according to an embodiment of the present invention.

Operation of the image processing system 100 is now described in reference to the flow-chart of FIG. 12. A typical original Gabor mask function $h(x,y,\theta_i,f_j)$ is expressed as follows:

$$h(x, y, \theta_i, f_j) = \exp\left\{-\frac{1}{2}\left[\frac{(x\cos\theta_i)^2}{\delta_x^2} + \frac{(y\sin\theta_i)^2}{\delta_y^2}\right]\right\} \quad \text{[Equation 1]}$$
$$\cos\{2\pi f_j(x\sin\theta_i + y\cos\theta_i)\}$$

Figure 3:
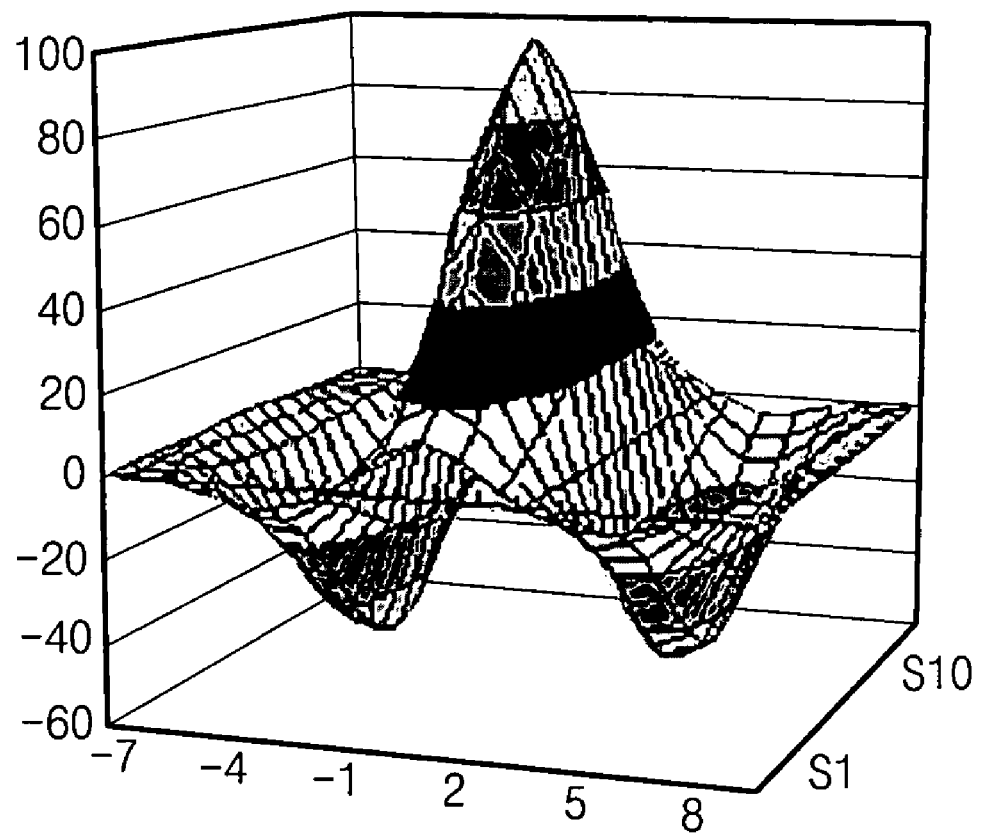

Such a mask function is a modulated Gaussian function, and x and y respectively represent X and Y coordinates; $\theta_i$ and $f_j$ respectively represent orientation and frequency; and $\delta_x$ and $\delta_y$ respectively represent standard deviations of the Gaussian function along the X and Y coordinates. FIG. 2 is a two-dimensional representation of the example original Gabor mask function $h(x,y,\theta_i,f_j)$ for N×N coordinate points, while FIG. 3 is a three-dimensional representation of the example original Gabor mask function $h(x,y,\theta_i,f_j)$.

Figure 8:
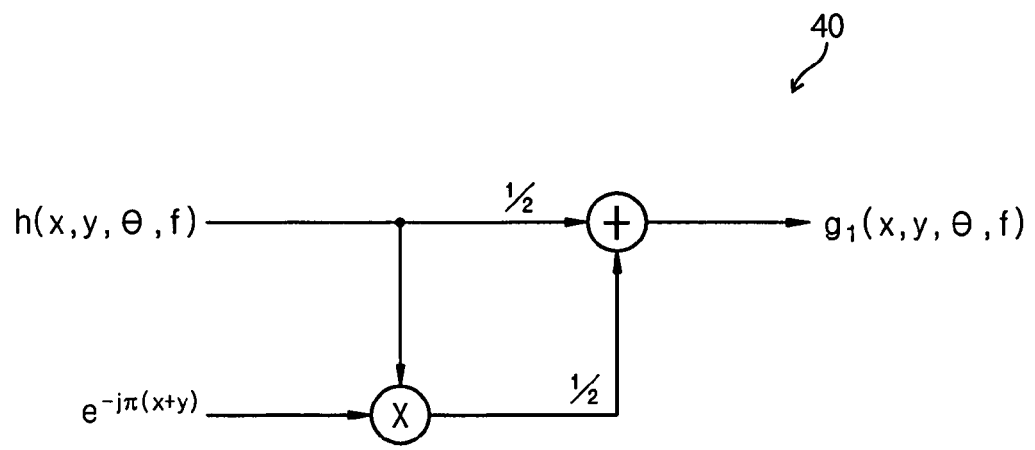
FIG. 8 is a symbolic diagram illustrating modification of the original Gabor mask function to generate the modified Gabor mask function of FIGS. 4 and 5, according to one embodiment of the present invention.

The first mask generator 40 in the Gabor filter 30 of the present invention modifies the original Gabor mask function $h(x,y,\theta_i,f_j)$ to a modified Gabor mask function $g_{1L}(x, y, \theta_i, f_j)$ (step 4000 of FIG. 12). As illustrated in the diagram of FIG. 8 according to one embodiment of the present invention, the modified Gabor mask function $g_{1L}(x, y, \theta_i, f_j)$ is expressed as follows:

$$g_{1L}(x, y, \theta_i, f_j) = \frac{1}{2}\{h(x, y, \theta_i, f_j) + \quad \text{[Equation 2]}$$
$$(e^{j\pi})^{x+y} h(x, y, \theta_i, f_j)\}$$

When $\delta_x$ and $\delta_y$ are each set to $\delta_0$, the Fourier transform $G_h(u, v)$ of the modified Gabor mask function $g_{1L}(x, y, \theta_i, f_j)$ is expressed as follows:

$$G_h(u, v) = \frac{1}{2}\{G(u, v) + G(u - \pi, v - \pi)\} \quad \text{[Equation 3]}$$

with $G(u, v)$ being the Fourier transform of the original mask function $h(x,y,\theta_i,f_j)$.

Thus, the frequency component of the modified Gabor mask function $g_{1L}(x, y, \theta_i, f_j)$ is an average of $G(u, v)$ and $G(u-\pi, v-\pi)$. $G(u-\pi, v-\pi)$ is frequency shifted by $\pi$ from $G(u, v)$ along the X-frequency (i.e., u) and the Y-frequency (i.e., v) axes. The following Table 1 represents values of the modified Gabor mask function $g_{1L}(x, y, \theta_i, f_j)$ for the X and Y coordinate values:

TABLE 1

| Y | X | |
|---|---|---|
| | Even pixel | Odd pixel |
| Even pixel | $g_{1L}(x, y, \theta_i, f_j) = h(x, y, \theta_i, f_j)$ | $g_{1L}(x, y, \theta_i, f_j) = 0$ |
| Odd pixel | $g_{1L}(x, y, \theta_i, f_j) = 0$ | $g_{1L}(x, y, \theta_i, f_j) = h(x, y, \theta_i, f_j)$ |

Figure 4:
FIGS. 4 and 5 illustrate two-dimensional and three-dimensional representations of a modified Gabor mask function for reducing the number of calculations by about ½, according to an embodiment of the present invention.

Thus, the modified Gabor mask function $g_{1L}(x, y, \theta_i, f_j)$ has a zero value whenever the X and Y coordinate values add up to an odd number. Otherwise, the modified Gabor mask function $g_{1L}(x, y, \theta_i, f_j)$ has the value of the original mask function $h(x,y,\theta_i,f_j)$. Such a modification results in a checker-board pattern of given zero values for the modified Gabor mask function $g_{1L}(x, y, \theta_i, f_j)$ as illustrated in FIG. 4.

Further referring to FIGS. 1 and 12, the first filter 50 performs a convolution of the image IMG' with such a modified Gabor mask function $g_{1L}(x, y, \theta_i, f_j)$ from the first mask generator 40 (step 5000 of FIG. 12). In one embodiment of the present invention, the first filter 50 does not perform a calculation for any zero values of the modified Gabor mask function $g_{1L}(x, y, \theta_i, f_j)$ thereby effectively ignoring such data points. Thus, the number of data points for the modified Gabor mask function $g_{1L}(x, y, \theta_i, f_j)$ and in turn the number of calculations in the convolution within the first filter 50 is effectively reduced by ½, as illustrated in FIG. 4.

Figure 5:
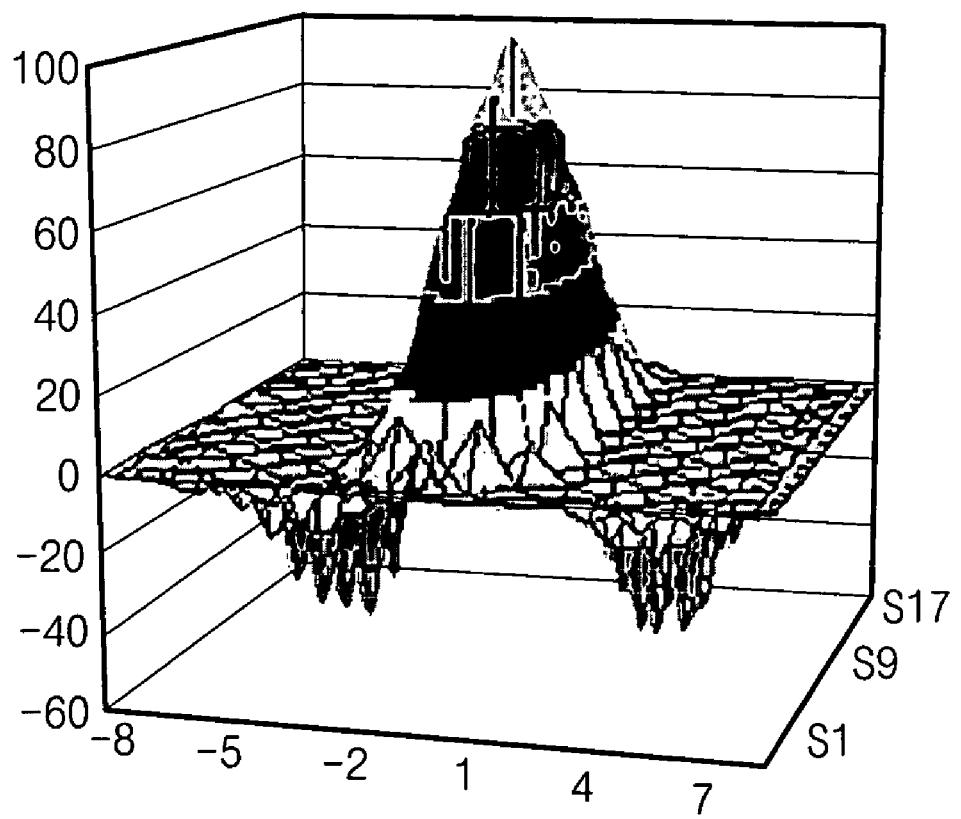

FIG. 5 is a three-dimensional representation of the modified Gabor mask function $g_{1L}(x, y, \theta_i, f_j)$ and illustrates that the modified Gabor mask function $g_{1L}(x, y, \theta_i, f_j)$ is not changed substantially from the original mask function $h(x,y,\theta_i,f_j)$. Thus, the result of convolution with the modified Gabor mask function $g_{1L}(x, y, \theta_i, f_j)$ within the first filter 50 is in turn not much degraded even though the number of calculations has been reduced. Such a reduced number of calculations allows the Gabor filter 30 to be implemented as an embedded system with small silicon die area.

Figure 9:
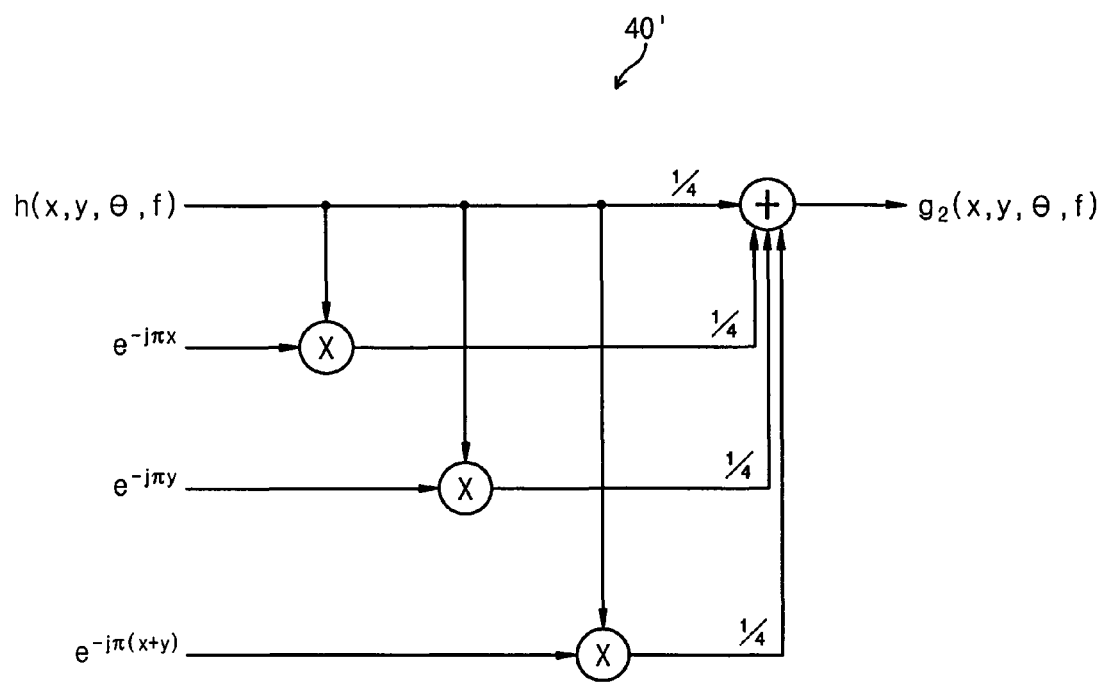
FIG. 9 is a symbolic diagram illustrating modification of the original Gabor mask function to generate the modified Gabor mask function of FIGS. 6 and 7, according to another embodiment of the present invention.

In another embodiment of the present invention as illustrated in FIG. 9, the first mask generator 40 modifies the original Gabor mask function $h(x,y,\theta_i,f_j)$ to a modified Gabor mask function $g_{2L}(x, y, \theta_i, f_j)$ (step 4000 of FIG. 12) as follows:

$$g_{2L}(x, y, \theta_i, f_j) = \frac{1}{4}\{e^{j\pi})^x h(x, y, \theta_i, f_j) + \quad \text{[Equation 4]}$$
$$(e^{j\pi})^y h(x, y, \theta_i, f_j) +$$
$$2g_{1L}(x, y, \theta_i, f_j)\}$$
$$= \frac{1}{4}\{(-1)^x h(x, y, \theta_i, f_j) +$$

$$(-1)^y h(x, y, \theta_i, f_j) +$$
$$h(x, y, \theta_i, f_j) +$$
$$(-1)^{x+y} h(x, y, \theta_i, f_j)\}$$

The Fourier transform $G_h(u, v)$ of the modified Gabor mask function $g_{2L}(x, y, \theta_i, f_j)$ is expressed as follows:

$$G_h(u, v) = \frac{1}{4}\{G(u, v) + G(u - \pi, v) + \quad \text{[Equation 5]}$$
$$G(u, v - \pi) + G(u - \pi, v - \pi)\}$$

with $G(u, v)$ being the Fourier transform of the original mask function $h(x,y,\theta_i,f_j)$.

Thus, the frequency component of the modified Gabor mask function $g_{1L}(x, y, \theta_i, f_j)$ is an average of $G(u,v)$, $G(u-\pi,v)$, $G(u,v-\pi)$ and $G(u-\pi,v-\pi)$. $G(u-\pi,v)$, $G(u,v-\pi)$, and $G(u-\pi,v-\pi)$, are frequency shifted by $\pi$ from $G(u, v)$ along the X-frequency (i.e., u) axes, along the Y-frequency (i.e., v) axes, and along the X and Y frequency axes (i.e., u and v), respectively.

The following Table 2 represents values of the modified Gabor mask function $g_{2L}(x, y, \theta_i, f_j)$ for the X and Y coordinate values:

TABLE 2

| Y | X | |
|---|---|---|
| | Even pixel | Odd pixel |
| Even pixel | $g_{2L}(x, y, \theta_i, f_j) = h(x, y, \theta_i, f_j)$ | $g_{2L}(x, y, \theta_i, f_j) = 0$ |
| Odd pixel | $g_{2L}(x, y, \theta_i, f_j) = 0$ | $g_{2L}(x, y, \theta_i, f_j) = 0$ |

Figure 6:
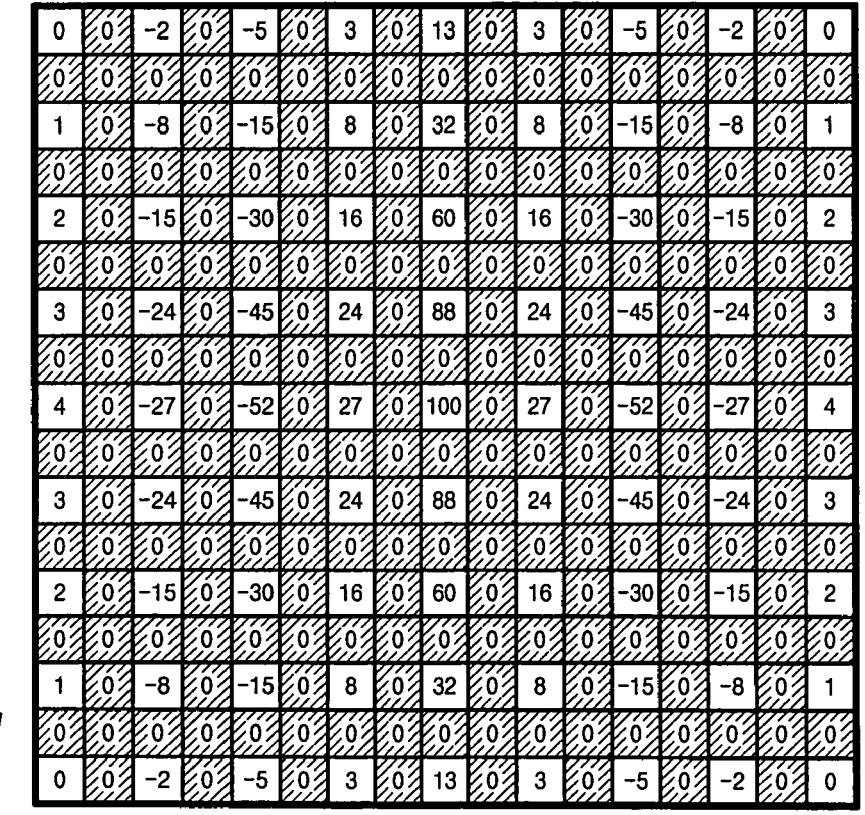
FIGS. 6 and 7 illustrate two-dimensional and three-dimensional representations of a modified Gabor mask function for reducing the number of calculations by about ¼, according to an embodiment of the present invention.

Thus, the modified Gabor mask function $g_{2L}(x, y, \theta_i, f_j)$ has a zero value whenever both of the X and Y coordinate are not an even number. On the other hand, when both of the X and Y values are each an even number, the modified Gabor mask function $g_{2L}(x, y, \theta_i, f_j)$ has the value of the original mask function $h(x,y,\theta_i,f_j)$. Such a modification results in a pattern of values being surrounded by zero values for the modified Gabor mask function $g_{2L}(x, y, \theta_i, f_j)$ as illustrated in FIG. 6.

When the first filter 50 performs a convolution of the image IMG' with such a modified Gabor mask function $g_{2L}(x, y, \theta_i, f_j)$, the first filter 50 does not perform a calculation for any zero values of the modified Gabor mask function $g_{2L}(x, y, \theta_i, f_j)$ thereby effectively ignoring such data points. Thus, the number of data points for the modified Gabor mask function $g_{2L}(x, y, \theta_i, f_j)$ and in turn the number of calculations in the convolution within the first filter 50 is effectively reduced by ¼, as illustrated in FIG. 6.

Figure 7:
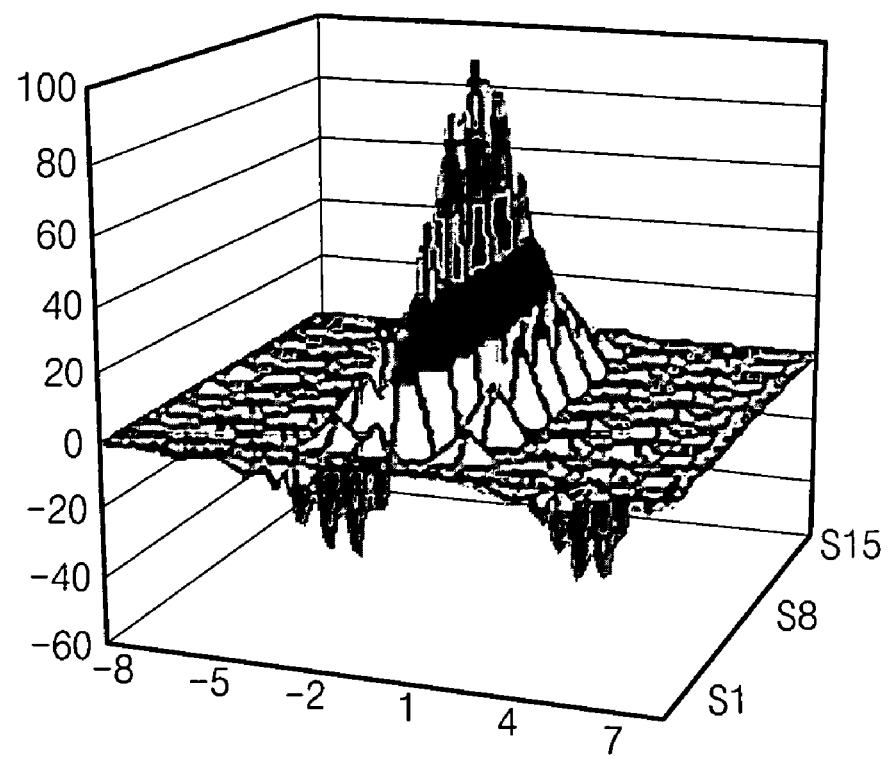

FIG. 7 is a three-dimensional representation of the modified Gabor mask function $g_{2L}(x, y, \theta_i, f_j)$ and illustrates that the modified Gabor mask function $g_{2L}(x, y, \theta_i, f_j)$ is not changed substantially from the original mask function $h(x,y,\theta_i,f_j)$. Thus, the result of convolution with the modified Gabor mask function $g_{2L}(x, y, \theta_i, f_j)$ within the first filter 50 is in turn not much degraded even though the number of calculations has been reduced. Such a reduced number of calculations allows the Gabor filter 30 to be implemented as an embedded system with small silicon die area.

Referring back to FIGS. 1 and 12, in either case of the modified Gabor mask function $g_{1L}(x, y, \theta_i, f_j)$ or $g_{2L}(x, y, \theta_i,$ $f_j)$, the first filter 50 generates a first filtered image from convolution of the image IMG' and one of $g_{1L}(x, y, \theta_i, f_j)$ or $g_{2L}(x, y, \theta_i, f_j)$. Thereafter, the second mask generator 60 generates a LPF (low pass filter) mask function (step 6000 of FIG. 12).

FIG. 10 shows two-dimensional power spectrum representations in the frequency domain for low pass filtering of the first filtered image from the first filter 30. IMG_1L_MGF is the power spectrum representation of an image resulting from convolution with $g_{1L}(x, y, \theta_i, f_j)$, when the orientation $\theta_i$ is 45° and the core frequency $f_j$ is 1.0. IMG_2L_MGF is the power spectrum representation of an image resulting from convolution with $g_{2L}(x, y, \theta_i, f_j)$, when the orientation $\theta_i$, is 45° and the core frequency $f_j$ is 1.0.

Further in FIG. 10, LPF is the power spectrum representation in the frequency domain of the LPF mask function as generated by the second mask generator 60. The second filter 70 convolves the first filtered image from the first filter 50 with such a LPF mask function to generate a second filtered image IMG_MGF (step 7000 of FIG. 12). IMG_MGF in FIG. 10 is the power spectrum representation in the frequency domain of the resulting image after convolution of IMG_IL_MGF or IMG_2L_MFG with the LPF mask function.

FIG. 10 illustrates that IMG_IL_MGF and IMG_2L_MFG have high frequency components (shown as bright areas further away from the center in FIG. 10) that may degrade the resulting processed image. In addition, such high frequency components are increased with higher number of zero values in the modified Gabor mask function from the first mask generator 40.

Convolution with the LPF mask function from the second mask generator 60 removes such high frequency components (step 7000 of FIG. 12). Thus, the second filtered image IMG_MGF from the second filter 70 is comprised of just the low-frequency components (shown as bright areas nearer the center in FIG. 10) of the first filtered image IMG_IL_MGF or IMG_2L_MFG from the first filter 50.

Table 3 below shows a comparative number of calculations in the first filter 50 when using $h(x,y,\theta_i,f_j)$, $g_{1L}(x, y, \theta_i, f_j)$, or $g_{2L}(x, y, \theta_i, f_j)$ for performing the convolution:

TABLE 3

| | $h(x, y, \theta_i, f_j)$ | $g_{1L}(x, y, \theta_i, f_j)$, | $G_{2L}(x, y, \theta_i, f_j)$ |
|---|---|---|---|
| Number of Calculations | $N * N$ | $N * \frac{N}{2} + M * M$ | $\frac{N}{2} * \frac{N}{2} + M * M$ |

N above denotes an example size of a mask of values of a Gabor mask function (as illustrated in FIGS. 2, 4, and 6), and M denotes an example size of a mask of values from the second mask generator 60.

Typically, N is significantly larger than M (i.e., N>>M). For example, N is in a range of 15 to 21, while M is in a range of 3 to 7. In that case, the number of calculations is effectively reduced by ½ or ¼ for the modified Gabor functions $g_{1L}(x, y, \theta_i, f_j)$ or $g_{2L}(x, y, \theta_i, f_j)$ even with the LPF operation. The number of calculations may be reduced even further if the LPF operation is not included in the Gabor filter 30.

Figure 11C:
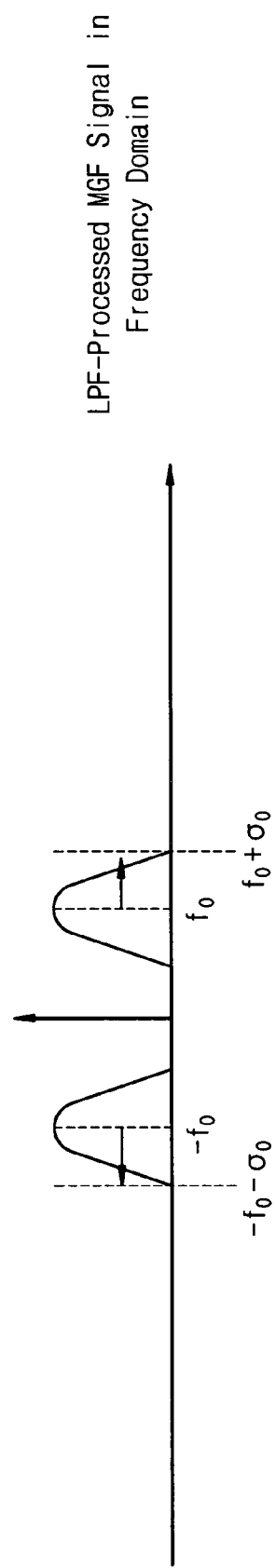

FIGS. 11A, 11B, and 11C show frequency characteristics along a one-dimensional projection from FIG. 10 illustrating determination of the LPF mask function in the second mask generator 60, according to an embodiment of the present invention. FIG. 11A shows a frequency characteristic of the modified Gabor mask function $g_{1L}(x, y, \theta_i, f_j)$ projected from FIG. 10 along 1-dimension.

FIG. 11B shows desired ranges of the frequency characteristic of the LPF mask function generated by the second mask generator 60 given the frequency characteristic of $g_{1L}(x, y, \theta_i, f_j)$ in FIG. 11A. FIG. 11C shows the resulting frequency characteristic when $g_{1L}(x, y, \theta_i, f_j)$ of FIG. 11A has been convolved with a LPF mask function of FIG. 11B.

The desired range of the pass bandwidth $\sigma_{lpf}$ of the LPF mask function depends on the frequency characteristic of $g_{1L}(x, y, \theta_i, f_j)$ in FIG. 11A, as follows:

$$f_0 + \sigma_0 < \sigma_{lpf} < f_0 - \sigma_0 + \pi \quad \text{[Equation 6]}$$

Here, $f_0$ represents a core frequency of the modified Gabor mask function and $\sigma_0$ is the standard deviation of the Gaussian in the modified Gabor mask function. If the Equation 6 is transformed into the 2-dimensional domain, the pass bandwidth $\sqrt{u^2+v^2}$ of the LPF is expressed as follows:

$$\sqrt{(f_0+\delta_0)^2} < \sqrt{u^2+v^2} < \sqrt{(f_0+\pi-\delta_0)^2} \quad \text{[Equation 7]}$$

Such removal of the high frequency components by the second filter 70 results in the second filtered image IMG_MGF being more similar to the case that the original Gabor mask function $h(x,y,\theta_i,f_j)$ were used for the convolution in the first filter 50.

Figure 13:
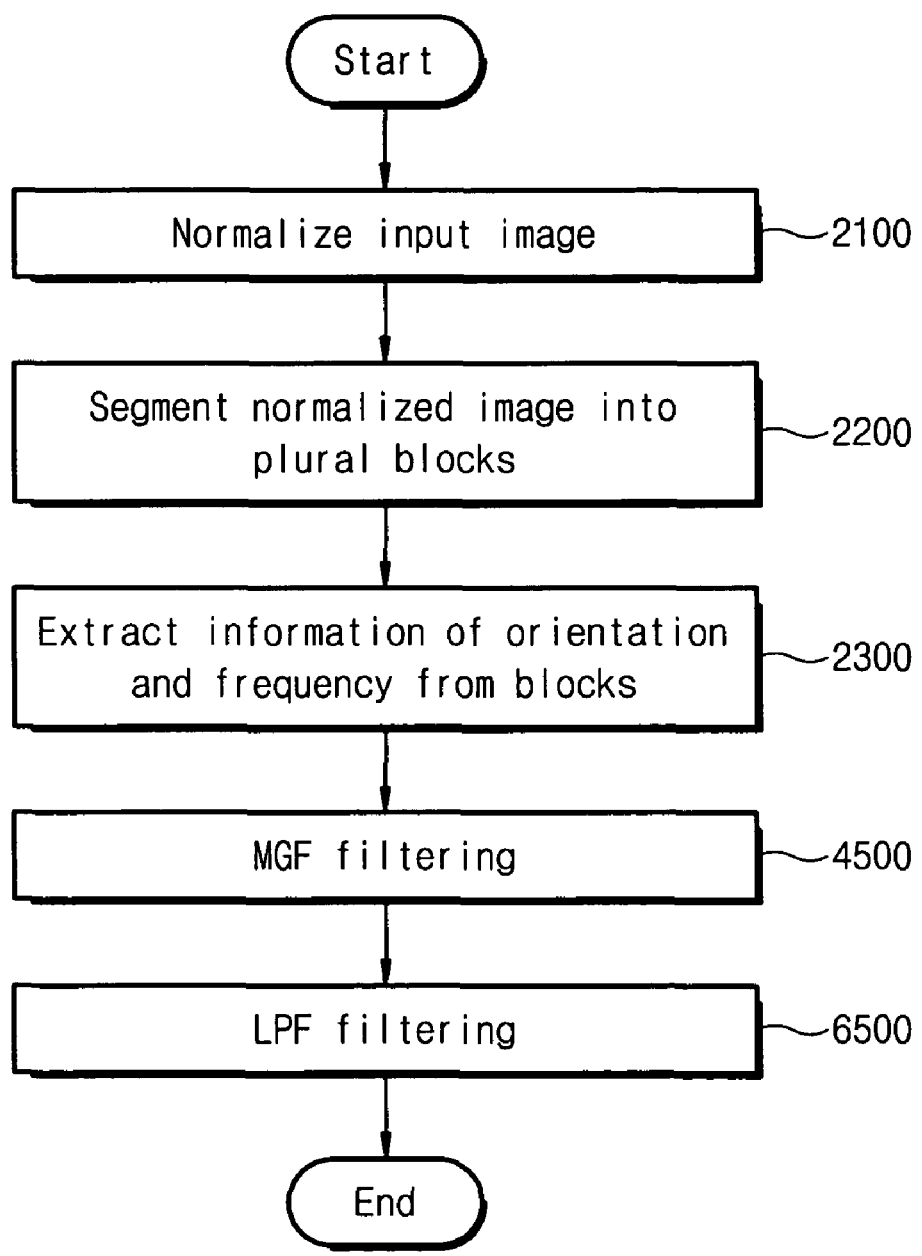
FIG. 13 is a flow chart of steps during operation of the image processing system in FIG. 1, for image enhancement according to an embodiment of the present invention.

Next, some example applications of the image processing system 100 of FIG. 1 are described. FIG. 13 is a flow chart of steps for the application of image enhancement for example. Referring to FIGS. 1 and 13, the pre-processing unit 20 normalizes an initial image IMG (step 2100 in FIG. 13) to generate a pre-processed (i.e., normalized) image IMG', such as by adjusting brightness according to the following Equation 8:

$$N(x, y) = \begin{cases} M_0 + \sqrt{\dfrac{V_0(I(x, y) - M)^2}{V}}, & \text{if } I(x, y) < M \\ M_0 - \sqrt{\dfrac{V_0(I(x, y) - M)^2}{V}}, & \text{otherwise} \end{cases} \quad \text{[Equation 8]}$$

I(x,y) denotes the initial image IMG; M represents an overall average brightness of I(x,y); V denotes an overall average dispersion of I(x,y); $M_0$ denotes a desired brightness; and $V_0$ denotes a desired average dispersion.

Further referring to FIG. 13, parameters of the Gabor mask function to be used in the Gabor filtering are desired to be determined. To this end, the normalized image IMG' is segmented into a plurality of blocks, each having a size of N×N for example (step 2200 of FIG. 13). Parameters such as orientations and frequencies are then extracted from the blocks (step 2300 of FIG. 13).

Figure 14:
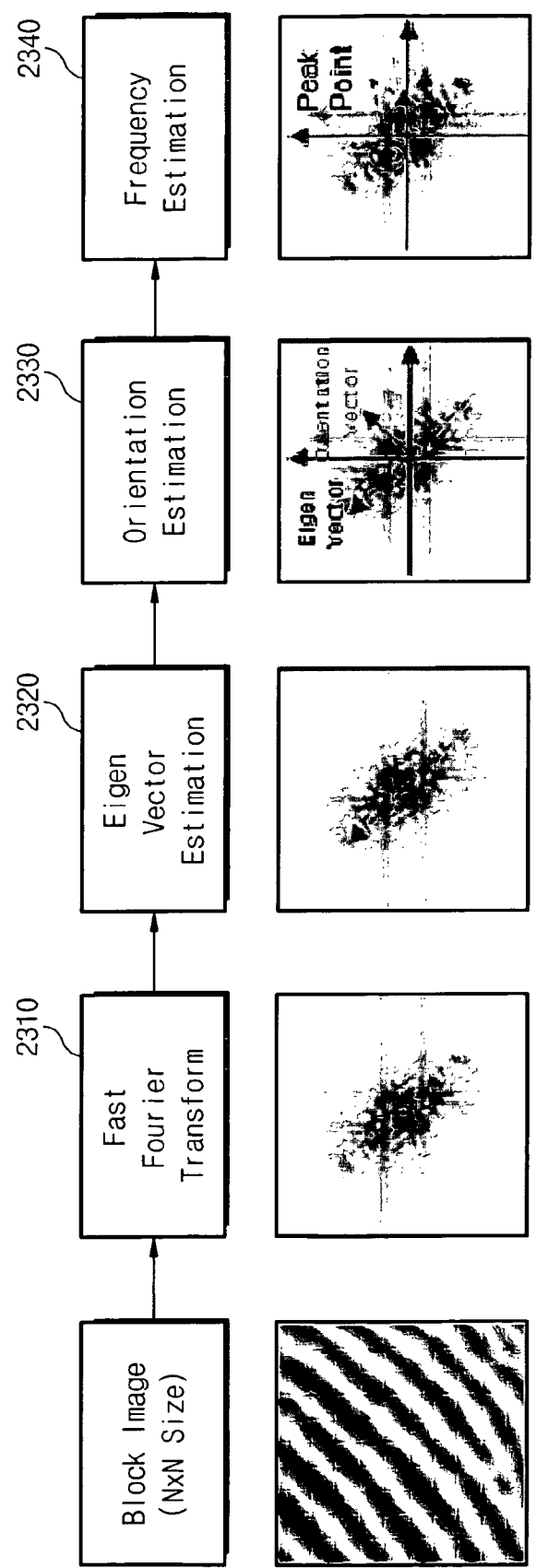
FIGS. 14 and 15 show two-dimensional power spectrum representations illustrating extraction of parameters for a Gabor mask function.
Figure 15:
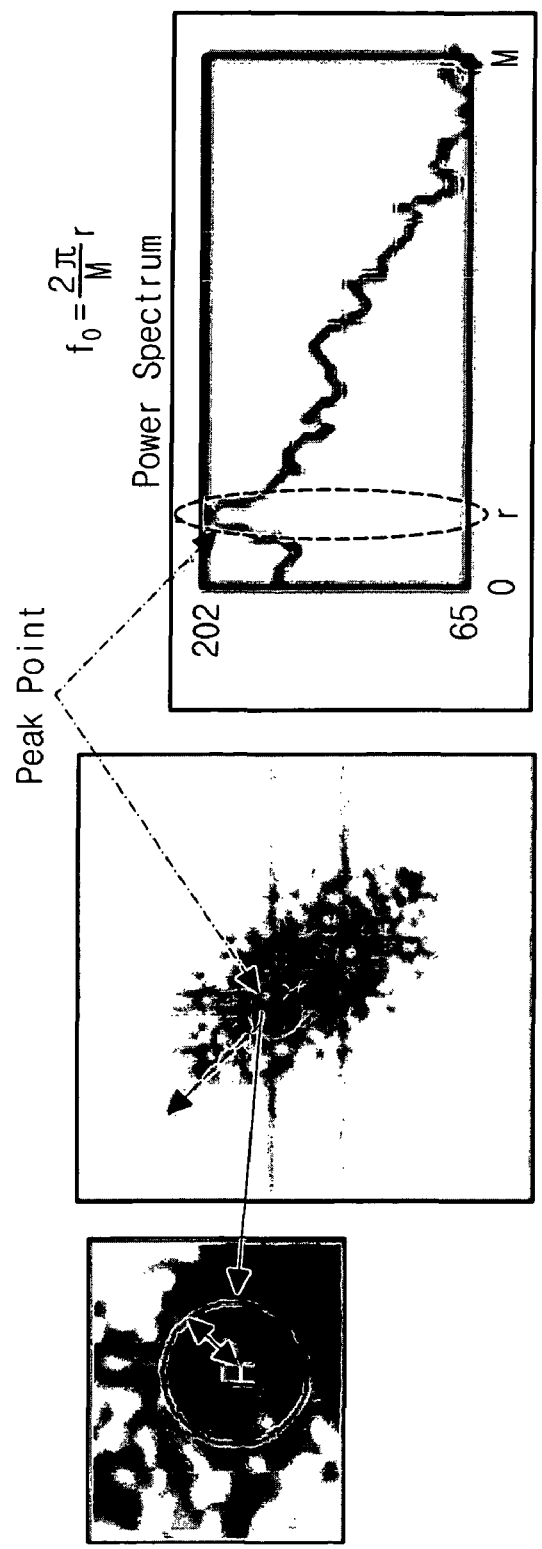

FIGS. 14 and 15 show two-dimensional power spectrum representations illustrating extraction of parameters such as orientations and frequencies for the Gabor mask function. Referring to FIGS. 14 and 15, a Fourier transform is generated for each N×N block image (2310 in FIG. 14), an Eigen value estimation (2320 in FIG. 14) is performed on such a Fourier transform, and orientation and frequency estimations (2330 and 2340) are then performed from such Eigen value estimation. Such estimations generally and individually are known to one of ordinary skill in the art.

For example, referring to FIGS. 14 and 15, for evaluating an Eigen vector, the full angular 360° degree is divided into M sections (e.g., 16 sections). The power levels of the image signal, which are segmented into the angular orientations with centering on a primitive point Fn(u,v), are summed up by the following Equation 9 for determining the peak point $S_{imax}$ from the summed signals $S_i$. The orientation parameter $\theta_i$ corresponding to the peak point Simax among the summed signals $S_i$ is defined as an Eigen-vector orientation parameter $\theta_{eigen}$.

$$S_i = \sum_{r=-\frac{R}{2}}^{\frac{R}{2}} F_n(R + r\cos\theta_i, R + r\sin\theta_i) \quad \text{[Equation 9]}$$

The parameter R is a radius of the circle depicted in FIG. 15, and the orientation coefficient $\theta_i$ has the following values:

$$\theta_i = \left\{0, \frac{2\pi}{M}, \dots, \frac{2\pi(M-1)}{M}\right\}.$$

An orientation vector of a block signal, $\theta_0$, is defined by the following Equation 10.

$$\theta_0 = \theta_{eigen} - \frac{\pi}{2} \quad \text{[Equation 10]}$$

The frequency of the block signal, $f_0$, is determined from a distance between the primitive point Fn(u,v) and the peak point (i.e., a point with the maximum power level) in the signals of the Eigen-vector orientation. The evaluation for the peak point proceeds with projecting the signal of the Eigen-vector orientation into the 1-dimensional domain as illustrated in FIG. 15. During this, the block signal frequency $f_0$ is determined from the following Equation 11:

$$f_0 = \frac{2\pi}{M}r \quad \text{[Equation 11]}$$

r represents the distance between the peak point and the primitive point Fn(u,v).

Steps 2100, 2200, and 2300 of FIG. 13 may be performed by the pre-processing unit 20 of the image processing apparatus 100 in one embodiment of the present invention. With such parameters of orientation $\theta_0$ and core frequency $f_0$ determined, an original Gabor mask function in turn has been determined.

Thereafter, the Gabor filter 30 processes the normalized image IMG' by convolution with the modified Gabor mask function (step 4500 of FIG. 13) and further convolution with the LPF mask function (step 6500 of FIG. 13), as described according to FIG. 12. With such image processing, specific orientation $\theta_0$ and frequency $f_0$ are emphasized on the image for enhancement.

Figure 16A:
FIGS. 16A, 16B, 16C, and 16D show example images resulting when the image processing system of FIG. 1 performs image enhancement, according to an embodiment of the present invention.
Figure 16B:
Figure 16C:
Figure 16D:

FIGS. 16A, 16B, 16C, and 16D illustrate such image enhancement with FIG. 16A showing an input image, FIG. 16B showing image enhancement using an original Gabor mask function, and FIGS. 16C and 16D showing image enhancement using modified Gabor mask functions $g_{1L}(x, y, \theta_i, f_j)$ and $g_{2L}(x, y, \theta_i, f_j)$, respectively. Such figures illustrate that the quality of the resulting images 16C and 16D from using the respective modified Gabor mask functions is not degraded significantly from the resulting image 16B using the original Gabor mask function.

Figure 17:
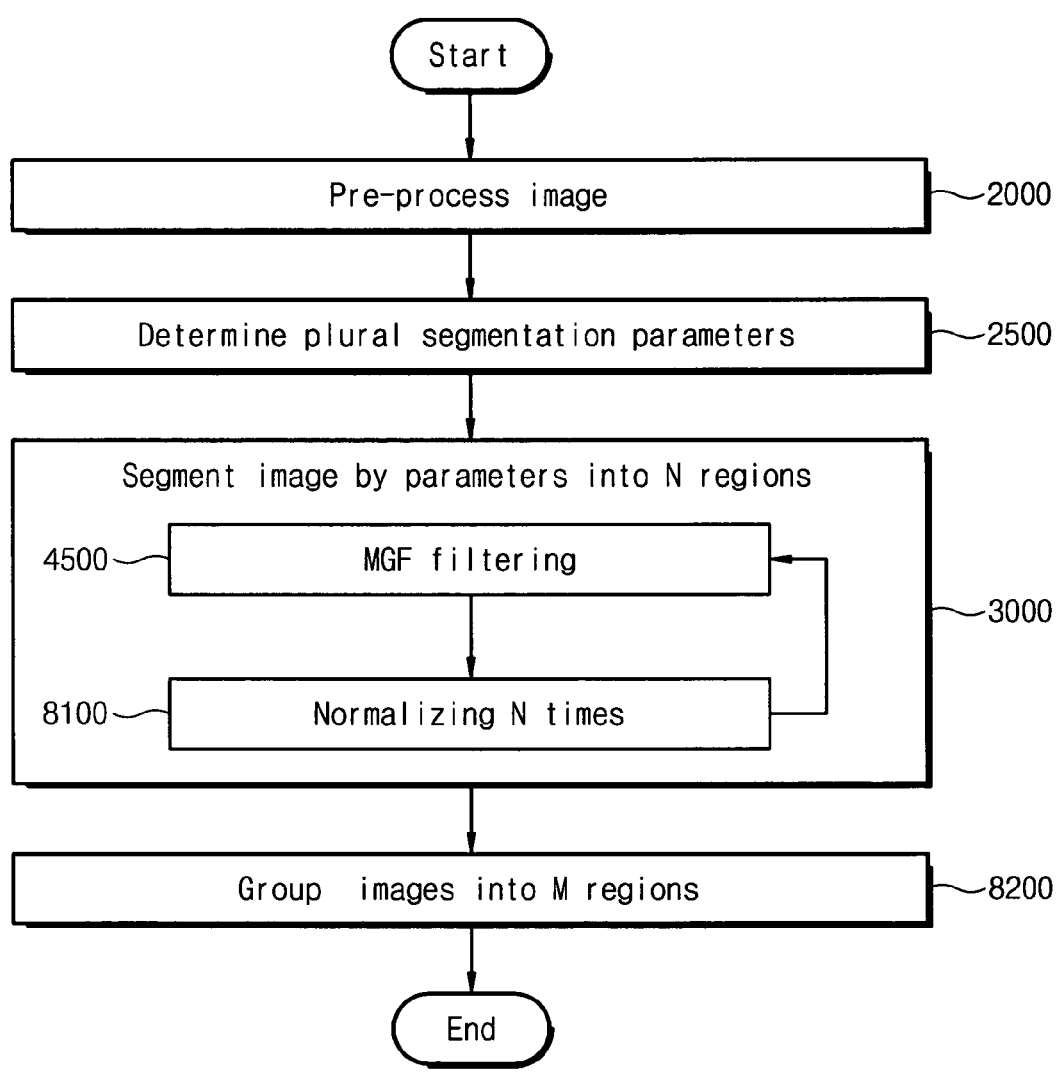
FIG. 17 is a flow chart of steps when the image processing system of FIG. 1 performs image segmentation, according to an embodiment of the present invention.

FIG. 17 is a flow chart of steps illustrating application of the image processing system 100 for image segmentation. Referring to FIG. 17, the pre-processing unit 20 pre-processes an initial image (step 2000 of FIG. 17) for contrast enhancement, noise cancellation, etc. The pre-processing unit 20 also determines segmentation parameters to be used for image segmentation (step 2500 of FIG. 17) which organizes the image into a plurality of regions. Such a step includes determining orientation and frequency parameters for each of the regions such as N regions for example.

Subsequently, a respective modified Gabor mask function is determined for performing Gabor filtering in the Gabor filter 30 for each of the regions (step 4500 in FIG. 17) and each of such filtered regions is normalized (step 8100 in FIG. 17). Such steps 4500 and 8100 comprise the segmentation step 3000 in FIG. 17.

After obtaining the N segmentation images after step 3000, the N images are grouped into M (such a 3) regions (step 8200 of FIG. 17). The steps 8100 and 8200 may be performed by the post-processing unit 80 in FIG. 1.

FIGS. 18A, 18B, 18C, 18D, 18E, and 18F show example patterns of such image segmentation of FIG. 17. FIG. 18A shows a first input image; FIG. 18B shows the N segmentation images of the first input image generated after step 3000 in FIG. 17; and FIG. 18C shows the grouped M regions of the first input image after step 8200 in FIG. 17. FIG. 18C shows the desired segmentation regions corresponding to the eyes, nose, and mouth of the first input image.

FIG. 18D shows a second example input image of a finger-print. The present invention of FIG. 17 may also segment specific-oriented regions with FIG. 18E showing a result of image segmentation having an orientation of 45° for the second input image of FIG. 18D. FIG. 18F shows a result of image segmentation having an orientation of 110° for the second input image of FIG. 18D.

Figure 19:
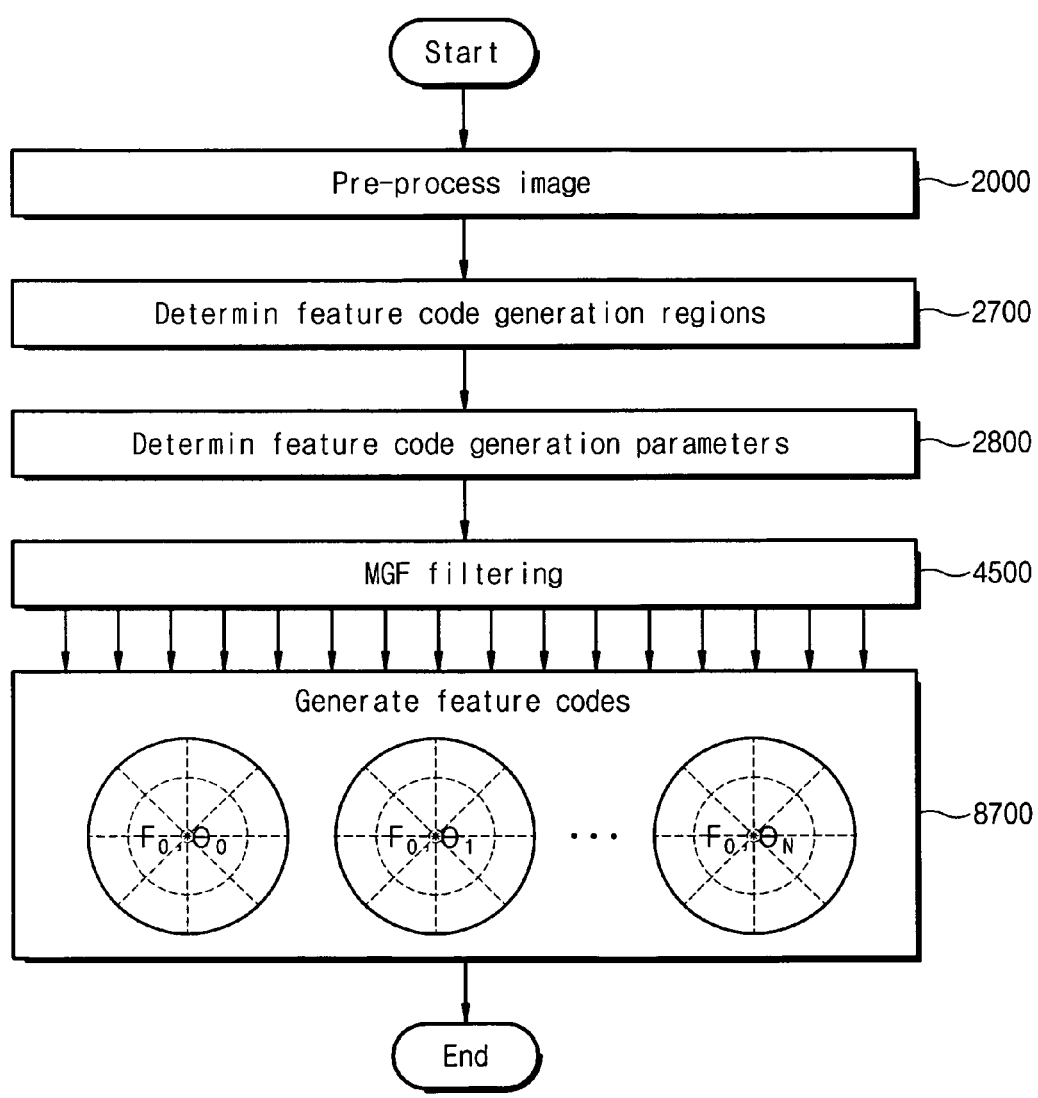
FIG. 19 is a flow chart of steps when the image processing system of FIG. 1 extracts feature codes from an image, according to an embodiment of the present invention.

FIG. 19 is a flow chart of steps illustrating application of the image processing system 100 for feature code generation. Typically, feature code generation is used for computer vision, pattern identification, and object identification such as fingerprints, irises, and faces.

Referring to FIG. 19, the pre-processing unit 20 pre-processes an initial image (step 2000 of FIG. 19) for contrast enhancement, noise cancellation, etc. The pre-processing unit 20 also determines feature code generation regions and parameters from the pre-processed image (steps 2700 and 2800 of FIG. 19).

Figure 20:
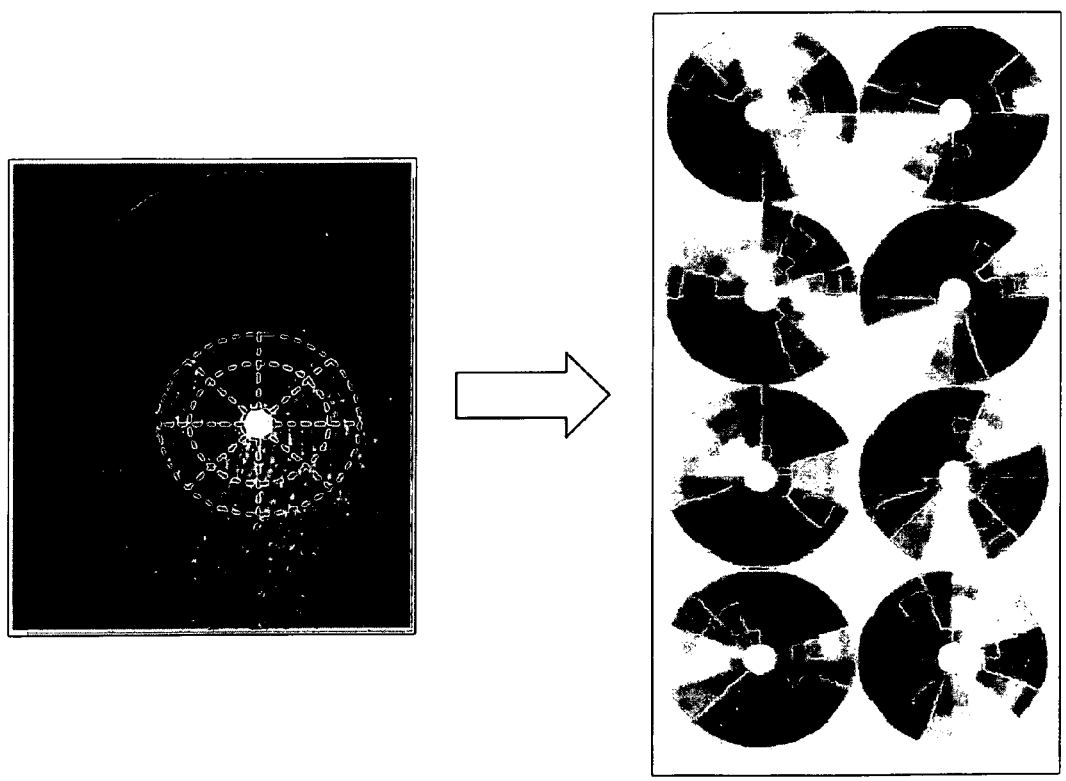
FIG. 20 illustrates example extraction of feature codes in the image processing system of FIG. 1, according to an embodiment of the present invention.

The Gabor filter 30 performs filtering on each of N feature code regions (step 4500 of FIG. 19), and N feature codes are generated in the post-processing unit 80 from the result of such Gabor filtering (step 8700 of FIG. 19). FIG. 20 shows eight example feature-code generation parameters having orientations incremented by 22.5° (i.e., 0°, 22.5°, 45°, . . . , and 157.5°) for identification of a finger-print.

In any of the applications of FIGS. 13, 17, and 19, the image processing system 100 with the enhanced Gabor filter 30 is used for reducing the number of calculations in Gabor filtering. Such reduction of the number of calculations allows the image processing system 100 to be fabricated as an embedded system on small silicon die area.

The foregoing is by way of example only and is not intended to be limiting. Thus, any number of elements as illustrated and described herein is by way of example only. In addition, the image processing system 100 may be used for other applications of image processing aside from the examples of FIGS. 13, 17, and 19.

Furthermore, the present invention may be used for other types of expressions of the Gabor mask function and other types of modifications to the original Gabor function aside from the examples described herein. Also, the implementation of the components 40, 50, 60, and 70 for the Gabor filter 30 as illustrated in FIGS. 21 and 22 are by way of example only. Such components may also be implemented as hardware circuits for carrying out any functions as described herein.

The present invention is limited only as defined in the following claims and equivalents thereof.

What is claimed is:

1. A Gabor filter comprising:
   a first mask generator that generates a modified Gabor mask function by shifting a core frequency of an original Gabor mask function along at least one of an X-axis and an Y-axis by $\pi$; and
   a first filter that performs a convolution of an image with the modified Gabor mask function to generate a first filtered image,
   wherein modification of the original Gabor mask function to the modified Gabor mask function reduces a number of calculations during the convolution within the first filter;
   and wherein the modified Gabor mask function has a zero-value for half of coordinate points, and wherein the first filter does not perform a calculation for the zero-values of the modified Gabor mask function during the convolution;
   and wherein the modified Gabor mask function is expressed as:

$$g_{1L}(x, y, \theta_i, f_j) = \frac{1}{2}\{h(x, y, \theta_i, f_j) + (e^{j\pi})^{x+y} h(x, y, \theta_i, f_j)\}$$

with $h(x, y, \theta_i, f_j)$ being the original Gabor mask function that is expressed as:

$$\exp\left\{-\frac{1}{2}\left[\frac{(x\cos\theta_i)^2}{\delta_x^2} + \frac{(y\sin\theta_i)^2}{\delta_y^2}\right]\right\}\cos\{2\pi f_j(x\sin\theta_i + y\cos\theta_i)\};$$

with x and y respectively denoting X and Y coordinates; $\theta_i$ and $f_j$ respectively denoting an orientation and a frequency; and $\delta_x$ and $\delta_y$ respectively denoting Gaussian standard deviations along the X and Y coordinates.

2. A Gabor filter comprising:
   a first mask generator that generates a modified Gabor mask function by shifting a core frequency of an original Gabor mask function along at least one of an X-axis and an Y-axis by $\pi$, and
   a first filter that performs a convolution of an image with the modified Gabor mask function to generate a first filtered image,
   wherein modification of the original Gabor mask function to the modified Gabor mask function reduces a number of calculations during the convolution within the first filter;
   and wherein the modified Gabor filter has a zero-value at three-fourths of coordinate points, and wherein the first filter does not perform a calculation for the zero-values of the modified Gabor filter during the convolution;
   and wherein the modified Gabor mask function is expressed as:

$$g_{2L}(x, y, \theta_i, f_j) = \frac{1}{4}\{(e^{j\pi})^x h(x, y, \theta_i, f_j) + (e^{j\pi})^y h(x, y, \theta_i, f_j) + 2g_{1L}(x, y, \theta_i, f_j)\}$$

$$= \frac{1}{4}\{(-1)^x h(x, y, \theta_i, f_j) + (-1)^y h(x, y, \theta_i, f_j) + h(x, y, \theta_i, f_j) + (-1)^{x+y} h(x, y, \theta_i, f_j)\}$$

with $h(x,y,\theta_i,f_j)$ being the original Gabor mask function that is expressed as:

$$\exp\left\{-\frac{1}{2}\left[\frac{(x\cos\theta_i)^2}{\delta_x^2} + \frac{(y\sin\theta_i)^2}{\delta_y^2}\right]\right\}\cos\{2\pi f_j(x\sin\theta_i + y\cos\theta_i)\};$$

with x and y respectively denoting X and Y coordinates; with $\theta_i$ and $f_j$ respectively denoting an orientation and a frequency; and with $\delta_x$ and $\delta_y$ respectively denoting Gaussian standard deviations along the X and Y coordinates.

3. A Gabor filter comprising:
   a first mask generator that generates a modified Gabor mask function by shifting a core frequency of an original Gabor mask function along at least one of an X-axis and an Y-axis by π;
   a first filter that performs a convolution of an image with the modified Gabor mask function to generate a first filtered image,
   wherein modification of the original Gabor mask function to the modified Gabor mask function reduces a number of calculations during the convolution within the first filter;
   a second mask generator for generating a LPF (low pass filter) mask function; and
   a second filter that performs a convolution of the first filtered image with the LPF mask function to generate a second filtered image comprised of low-frequency components of the first filtered image;
   wherein the LPF mask function is a Gaussian function, and wherein the LPF mask function has a pass bandwidth $\sqrt{u^2+v^2}$ as follows:

$$\sqrt{(f_0+\delta_0)^2} < \sqrt{u^2+v^2} < \sqrt{(f_0+\pi-\delta_0)^2}$$

with $f_0$ being a core frequency of the modified Gabor mask function and $\delta_0$ being the standard deviation of a Gaussian component of the modified Gabor mask function, and wherein $u^2$ is an X-axis frequency squared, and $v^2$ is an Y-axis frequency squared.

4. A method of processing an image, comprising:
   generating by a data processor a modified Gabor mask function by shifting a core frequency of an original Gabor mask function along at least one of an X-axis and an Y-axis by π; and
   performing by a data processor a convolution of the image with the modified Gabor mask function to generate a first filtered image,
   wherein modification of the original Gabor mask function to the modified Gabor mask function reduces a number of calculations during the convolution;
   and wherein the modified Gabor mask function has a zero-value for half of coordinate points, and wherein a calculation is not performed for the zero-values of the modified Gabor mask function during the convolution;
   and wherein the modified Gabor mask function is expressed as:

$$g_{1L}(x, y, \theta_i, f_j) = \frac{1}{2}\{h(x, y, \theta_i, f_j) + (e^{j\pi})^{x+y} h(x, y, \theta_i, f_j)\}$$

with $h(x, y, \theta_i, f_j)$ being the original Gabor mask function that is expressed as:

$$\exp\left\{-\frac{1}{2}\left[\frac{(x\cos\theta_i)^2}{\delta_x^2} + \frac{(y\sin\theta_i)^2}{\delta_y^2}\right]\right\}\cos\{2\pi f_j(x\sin\theta_i + y\cos\theta_i)\};$$

with x and y respectively denoting X and Y coordinates; $\delta_i$ and $f_j$ respectively denoting an orientation and a frequency; and $\delta_x$ and $\delta_y$ respectively denoting Gaussian standard deviations along the X and Y coordinates.

5. A method of processing an image, comprising:
   generating by a data processor a modified Gabor mask function by shifting a core frequency of an original Gabor mask function along at least one of an X-axis and an Y-axis by π; and
   performing by a data processor a convolution of the image with the modified Gabor mask function to generate a first filtered image,
   wherein modification of the original Gabor mask function to the modified Gabor mask function reduces a number of calculations during the convolution;
   and wherein the modified Gabor filter has a zero-value at three-fourths of coordinate points, and wherein a calculation is not performed for the zero-values of the modified Gabor mask function during the convolution;
   and wherein the modified Gabor mask function is expressed as:

$$g_{2L}(x, y, \theta_i, f_j) = \frac{1}{4}\{(e^{j\pi})^x h(x, y, \theta_i, f_j) + (e^{j\pi})^y h(x, y, \theta_i, f_j) + 2g_{1L}(x, y, \theta_i, f_j)\}$$

$$= \frac{1}{4}\{(-1)^x h(x, y, \theta_i, f_j) + (-1)^y h(x, y, \theta_i, f_j) + h(x, y, \theta_i, f_j) + (-1)^{x+y} h(x, y, \theta_i, f_j)\}$$

with $h(x,y,\theta_i,f_j)$ being the original Gabor mask function that is expressed as:

$$\exp\left\{-\frac{1}{2}\left[\frac{(x\cos\theta_i)^2}{\delta_x^2} + \frac{(y\sin\theta_i)^2}{\delta_y^2}\right]\right\}\cos\{2\pi f_j(x\sin\theta_i + y\cos\theta_i)\};$$

with x and y respectively denoting X and Y coordinates; with $\delta_i$ and $f_j$ respectively denoting an orientation and a frequency; and with $\delta_x$ and $\delta_y$ respectively denoting Gaussian standard deviations along the X and Y coordinates.

6. A method of processing an image, comprising:
   generating by a data processor a modified Gabor mask function by shifting a core frequency of an original Gabor mask function along at least one of an X-axis and an Y-axis by π;

performing by a data processor a convolution of the image with the modified Gabor mask function to generate a first filtered image, wherein modification of the original Gabor mask function to the modified Gabor mask function reduces a number of calculations during the convolution;

generating by a data processor a LPF (low pass filter) mask function; and performing by a data processor a convolution of the first filtered image with the LPF mask function to generate a second filtered image comprised of low-frequency components of the first filtered image;

and wherein the LPF mask function is a Gaussian function, and wherein the LPF mask function has a pass bandwidth $\sqrt{u^2+v^2}$ as follows:

$$\sqrt{(f_0+\delta_0)^2} < \sqrt{u^2+v^2} < \sqrt{(f_0+\pi-\delta_0)^2}$$

with $f_0$ being a core frequency of the modified Gabor mask function and $\delta_0$ being the standard deviation of a Gaussian component of the modified Gabor mask function, and wherein $u^2$ is an X-axis frequency squared, and $v^2$ is an Y-axis frequency squared.

* * * * *